Figure 1:
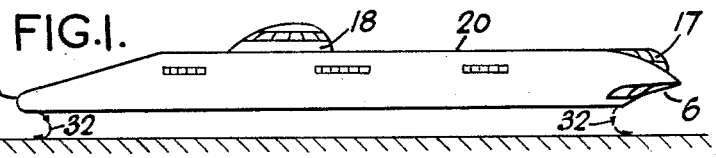

March 23, 1965  C. S. COCKERELL  3,174,570
VEHICLES FOR TRAVELLING OVER LAND AND/OR WATER
Filed March 1, 1961  2 Sheets-Sheet 1

Inventor
C. S. COCKERELL
By Cameron, Kerkam & Sutton
Attorneys

March 23, 1965  C. S. COCKERELL  3,174,570
VEHICLES FOR TRAVELLING OVER LAND AND/OR WATER
Filed March 1, 1961  2 Sheets-Sheet 2
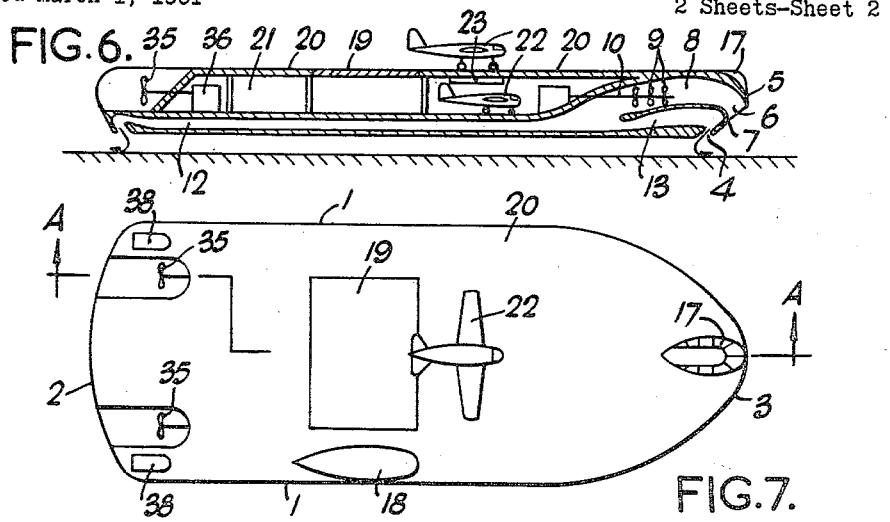
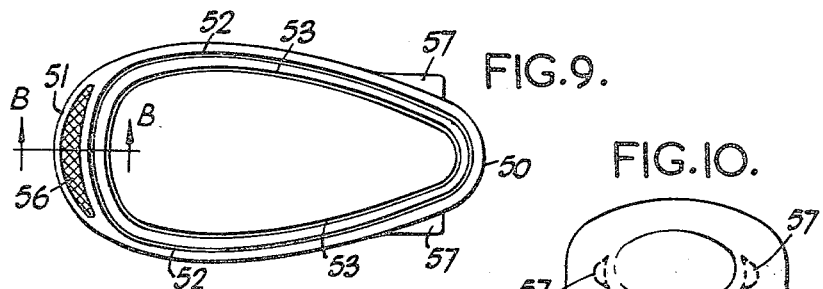
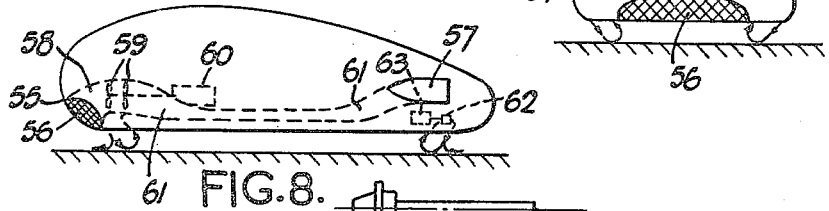
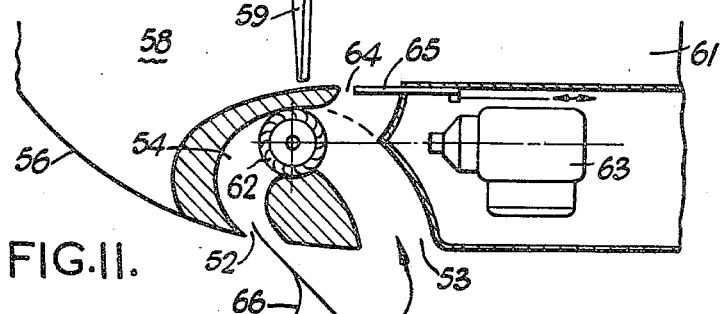
Inventor
C. S. COCKERELL
By Cameron, Kerkam & Sutton
Attorneys United States Patent Office 3,174,570
Patented Mar. 23, 1965

3,174,570
VEHICLES FOR TRAVELLING OVER LAND AND/OR WATER
Christopher Sydney Cockerell, Lymington, England, assignor to Hovercraft Development Limited, London, England, a company of Great Britain
Filed Mar. 1, 1961, Ser. No. 92,552
13 Claims. (Cl. 180—7)

This invention relates to vehicles for travelling over a surface and which are at least partly supported above that surface by a cushion of pressurised gas formed and contained beneath the vehicle.

In co-pending application Serial No. 731,338, dated April 28, 1958, now abandoned, of which this application is a continuation-in-part, there is described and illustrated a vehicle of the form described above, in particular an aircraft carrier, in which means are arranged to discharge at least one jet of fluid in such a way as to result in the formation of a curtain, the curtain at least partly forming and containing the cushion of pressurised gas beneath the vehicle.

When a vehicle of the form described above is travelling over the surface, a pressure build-up occurs at the front of the vehicle, this pressure, hereinafter referred to as a positive stagnation pressure, being due to the forward speed. In the specification of the aforesaid application Serial No. 731,338, there is described and illustrated a vehicle in which the air intake for the air used for the formation of the curtains and/or for propulsion is situated at the front of the vehicle, facing partly downwards, being positioned immediately above the region in which the positive stagnation pressure due to forward speed occurs.

By so positioning the air intake it is possible to take advantage of such positive stagnation pressure. Also, as will be seen from the description of the invention, it is possible to at least partly avoid any adverse effects which would be likely to occur due to the positive stagnation pressure attaining undesirable values, by at least reducing the positive stagnation pressure.

It is an object of the present invention to provide a vehicle of the type described above, having an air intake, or air intakes, so positioned that advantage may be taken of any positive stagnation pressure which occurs due to the forward speed of the vehicle.

It is a further object of the invention to provide a vehicle, of the type described above, having an air intake, or air intakes, so positioned that if air is withdrawn through the intake, or intakes, any positive stagnation pressure which occurs at the front of the vehicle can be reduced in value.

In the specification of the aforesaid co-pending application Serial No. 731,338, there is also described and illustrated a means of propelling, and controlling the direction of movement of, a vehicle by causing part of the air which is used for forming the air curtain, or curtains, to issue from ducts, the outlets of which are controlled by flaps. It is another object of the invention to provide a vehicle, as described above, in which air is diverted from assisting in forming the curtains and is used to propel and/or control the direction of movement of the vehicle.

Figure 2:
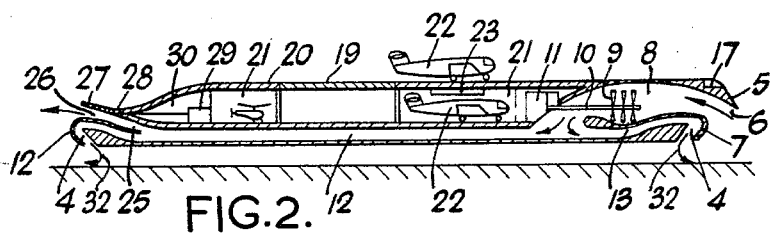
Figure 3:
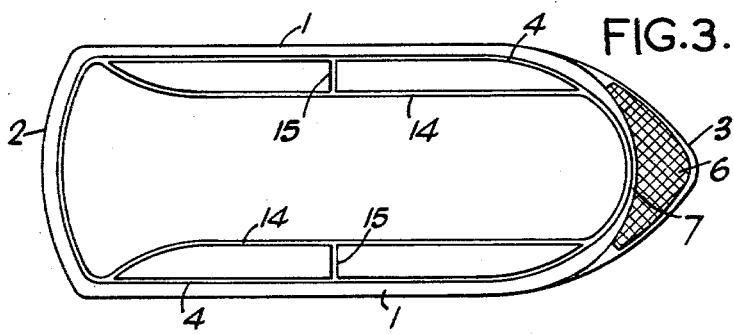
Figure 4:
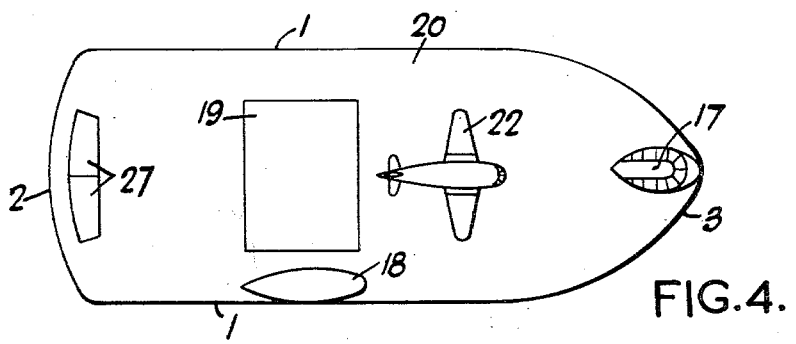
Figure 5:
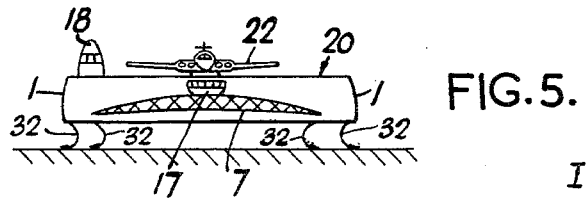

The invention will be more readily understood by the following description of various vehicles according to the invention in conjunction with the accompanying drawings in which:

FIGURE 1 is a side elevation of an aircraft carrier,
FIGURE 2 is a vertical cross-section on the longitudinal centre line of the aircraft carrier,
FIGURE 3 is an inverted plan view of the aircraft carrier,
FIGURE 4 is a plan view of the aircraft carrier,
FIGURE 5 is a front view of the aircraft carrier,
FIGURE 6 is a somewhat similar cross-section to that of FIGURE 2 on the line A—A of FIGURE 7 showing a modification of the aircraft carrier,
FIGURE 7 is a plan view of the aircraft carrier shown in FIGURE 6,
FIGURE 8 is a side view of another form of vehicle,
FIGURE 9 is an inverted plan view of the vehicle shown in FIGURE 8,
FIGURE 10 is a front view of the vehicle shown in FIGURE 8, and
FIGURE 11 is an enlarged fragmentary cross-section of the forward part of the vehicle shown in FIGURES 8 to 10 on the line B—B of FIGURE 9 showing the means of supplying air to the air curtain forming means.

The aircraft carrier shown in FIGURES 1 to 5 is in the form of a substantially flat platform having, in plan form, substantially straight parallel sides 1, a rounded aft end 2 and a rather more pointed forward end 3.

A supply port 4 is formed in the bottom surface of the carrier, extending adjacent to the periphery thereof. At the forward end the body of the carrier overhangs the bottom surface, as shown at 5, and an air intake 6 is formed in the underneath surface of this overhang. The lower edge 7 of the air intake 6 is adjacent to that part of the supply port 4 which is at the forward end of the vehicle so that the intake is inclined downwardly and faces the region in which a positive stagnation pressure is built up on forward movement of the vehicle.

The intake 6 leads into a duct 8 in which are disposed propellers 9. The propellers are driven via shaft 10 by engines 11 located in an engine room in the body of the carrier. From the duct 8, supply ducts 12 and 13 communicate with the supply port 4. To provide stabilising means, as described in co-pending application Serial No. 16,677, filed March 22, 1960, further supply ports 14 are formed in the bottom of the carrier inboard of and, for the majority of their length, parallel to those parts of the supply port 4 which extend along the sides of the vehicle. At their ends, the supply ports 14 connect with the supply port 4. Subsidiary supply ports 15 connect the supply ports 4 and 14 intermediate the ends of the ports 14. The supply ports 14 and 15 are also in communication with the ducts 12 and 13. The supply ports 4 and 14 are so arranged that the air issues from them in an inwards, and downward, direction, whilst the auxiliary supply ports 15 are arranged so that the air issues substantially vertical. The further supply ports 14 and auxiliary supply ports 15 subsdivide the space beneath the carrier to provide means for stabilising the vehicle. The action of such means is fully described in co-pending application Serial No. 16,677 and will not be further described herein.

The carrier is also provided with a cockpit 17 at the front, a control tower 18 positioned to one side of the carrier, and a lift 19 for raising and lowering of aircraft to and from the deck 20. Hangars 21 are formed within the body of the carrier for accommodating aircraft 22. Clamping means 23 is associated with the deck 20 of the carrier for holding an aircraft 22 in position on the deck of the carrier. The clamping means 23 may consist of clamps, trip wires, stops or the like. For example, mechanism of the construction disclosed in Patent No. 1,925,-768 would serve the purpose of the present invention in this respect.

The carrier can be propelled in various ways, and in the present example, part of the air from the propellers 9 flowing through the ducts 12 and 13 to the supply ports 4, 14 and 15, is capable of being diverted through a duct 25 to propulsion outlets 26 at the rear of the carrier. In the example shown, there are two of such propulsion outlets one on each side of the longitudinal centre line of the carrier. The outlets are provided with flaps 27 pivoted at 28 to the body of the carrier and operated by control means 29 situated in the compartment 30 in the body of the carrier. The amount of air which is diverted from the ducts 12 and 13 and issuing from the propulsion outlets 26 is controlled by the amount by which the flaps 27 are opened. Further, by operating the flaps 27 differentially, that is by varying the opening of one flap relative to the other, an offset thrust is created which can be used for steering and the like. Alternatively, each of the flaps 27 can be subdivided, part being opened for propulsion and part being used for steering etc.

The operation of the carrier is as follows: initially the carrier is at rest on the surface. On starting the engines 11, air is drawn in through the intake 6 by the propellers 9, and is fed into the ducts 12 and 13. From the ducts the air flows to the supply ports 4, 14 and 15 from which it issues in the form of air curtains. Initially the curtains formed from the supply ports 4 and 14 extend inwardly under the carrier, but a pressure is rapidly built up which lifts the carrier above the surface, at the same time deflecting the air curtains round and outwards as shown at 32. The flaps 27 are then both partially opened and some of the air in the duct 12 issues from the propulsion outlets and propels the carrier forward. As the carrier speeds up, a positive stagnation pressure builds up below the intake 6 and increases the effectiveness of the propellers 9. A greater mass flow of air results and further air is available for propulsion if required.

In order to launch an aircraft, the loaded aircraft 22 is clamped by the clamping means 23 in position on the deck 20 of the carrier, and the carrier is propelled forwardly in the manner described above. When the carrier has been speeded up until its velocity is above the minimum flying or take-off speed of the aircraft, at which time the aircraft will exert an upward pull on the carrier, the clamping means 23 is released whereupon the aircraft will rise from the carrier, the latter, due to the previous lifting action of the aircraft, will also fall away from the aircraft, and the aircraft becomes airborne. After take-off the carrier can be slowed down until the aircraft wishes to land, when it can be speeded up to the landing speed of the aircraft. The carrier can be manoeuvered to take up a suitable direction for take-off and landing, and also steered, by varying the opening of the flaps 27 relative to one another.

Instead of being propelled and steered by the issuing of air from propulsion outlets, a vehicle can be propelled in some other manner, only directional control being obtained by diverting air from the ducts supplying air to the supply ports. Such a vehicle is shown in FIGURES 6 and 7 which illustrate a modified form of the aircraft carrier shown in FIGURES 1 to 5 and described above, similar references being applied. The carrier operates in substantially the same way as described above, the only difference being that propellers 35, driven by engines 36, are provided at the rear of the carrier to propel it. To avoid interference with aircraft taking-off or landing, the propellers are situated each side of the carrier, recessed below the level of the deck. Outlets controlled by flaps 38, are provided at the rear, air from the duct 12 being diverted to these outlets when the flaps are opened, to provide directional control of the carrier, and may also be positioned at the sides of the carrier, as shown, to avoid interference with aircraft taking-off or landing.

A vehicle of a further form is illustrated in FIGURES 8, 9, 10 and 11. In this vehicle the air curtain is of the configuration in which at least part of the air forming the curtain is recovered and reused, such as is described in co-pending applications Serial Nos. 837,428 and 809,699, filed September 1, 1959 and April 29, 1959, respectively. The vehicle is approximately oval in plan form, being slightly more sharply radiused at the rear end 50 than at the forward end 51. In side elevation it is of a more streamlined shape, as can be seen in FIGURE 8. In the bottom surface of the vehicle a supply port 52 is formed, adjacent and substantially parallel to the periphery thereof. Spaced inboard of the supply port 52, and parallel to it, is a recovery port 53, the supply and recovery ports being connected by a transfer duct 54.

The forward end of the body of the vehicle overhangs the bottom surface of the vehicle as shown at 55. A downwardly inclined air intake 56 is formed in the under surface of the overhang, the lower edge of the intake being adjacent to that part of the supply port 52 which extends round the front part of the vehicle. Positioned to the rear of the vehicle, one on each side, are outlets 57. A duct 58 communicates with the intake 56, propellers 59 being situated in the duct 58. The propellers are driven by engines 60. Behind the propellers, the duct 58 divides into two ducts 61, which are positioned one on each side of the vehicle, and communicate with the outlets 57. Air energising means, diagrammatically represented by compressors or fans 62 driven by engines 63, are positioned in the transfer duct 54 to energise or re-energise the air flowing therethrough.

The vehicle operates as follows, the vehicle being considered initially at rest on the surface, the outlets 57 being closed. The engines 60 and 63 are started, rotating the propellers 59 and 62. The propellers 59 draw air in through the intake 56, and feed it into the ducts 61. As air is unable to enter the recovery port 53, air is fed to the transfer duct 54, from the ducts 61 through ports 64 controlled by sliding flaps 65. The air is then fed by the fans 62 round the transfer duct 54 and issues from the supply port 52 in the form of an air curtain. Initially, the air issues in an inward direction flowing under the vehicle. A pressure rapidly builds up beneath the vehicle lifting the vehicle off the surface and at the same time deflecting the air flowing from the supply port 52 round and upward so that it flows into the recovery port 53. The air then flows through the transfer duct, being re-energized by the fans 62.

Once the air flow pattern has been formed, most of the air flowing from the supply port 52 is recovered through the recovery port 53. A certain amount of air is lost however, particularly due to a portion of the air issuing from the supply port breaking away and flowing outwards as indicated at 66. Thus a smaller flow of air is required through the ports 64, being only that which is required to make up for losses. The flaps 65 are therefore partially closed, allowing only the required flow to take place. Air is then available for expulsion from the outlets 57. By suitably controlling the amount of air expelled from each outlet, for example by varying the extent to which each outlet is opened, the vehicle can also be steered.

As in the examples previously described, as the vehicle travels forward a positive stagnation pressure builds up immediately outside that part of the air curtain which is formed at the front of the vehicle. The position of the intake 56 is such that advantage can be taken of this pressure to increase the effectiveness of the propellers 59.

In the vehicles so far described, it has been assumed that at all times the pressure of the cushion contained by the air curtains is above the maximum pressure occurring outside the air curtains. That is, it is always arranged that the air curtain is acted upon by the cushion and that there is a pressure drop across the curtain from the inside to the outside. In vehicles which are intended to travel at fairly low speeds, such an arrangement is satisfactory, but as the speed increases so does the positive stagnation pressure at the front of the vehicle. If the cushion pressure is such as to always be above this stagnation pressure, the cushion pressure is liable to become very high, with a consequential increase in the strength of the air curtain to contain this pressure, round the sides and rear of the vehicle. Further as the cushion pressure increases, it is necessary to decrease the size of the cushion for a given load carrying capacity. Although this reduces to some extent the peripheral length of air curtain required, the reduction in air curtain peripheral length is of a different order to the reduction in area of the cushion, and power to weight requirements are less efficient.

Alternatively, the cushion pressure can be at a pressure which is below the positive stagnation pressure, in which case the curtain for that part of the periphery of the vehicle where the positive stagnation is higher than the cushion pressure acts in a reverse manner. Instead of containing the cushion it protects the cushion. That is instead of preventing the air forming the cushion from escaping to the surrounding atmosphere it prevents the positive stagnation pressure from entering the cushion.

The fluid curtain at the front of the vehicle can readily be arranged to prevent the positive stagnation pressure entering the cushion, but other disadvantages arise. For most efficient action of the curtain, to protect the cushion from the positive stagnation pressure, the fluid curtain should issue from a supply port flowing in an outwards direction. However for starting and operating at lower speeds, the most efficient action of the fluid curtain is when it issues in an inward direction. One way of overcoming this disadvantage is to provide means for varying the direction in which the curtain forming fluid issues.

A further disadvantage is that the positive stagnation pressure rapidly achieves values which require a very strong curtain to prevent it affecting the cushion. The provision of a strong curtain requires large mass flows together with large power requirements.

By preventing the formation of a positive stagnation pressure, or reducing the pressure to a suitable value, the fluid curtain at that part of the vehicle normally affected by the positive stagnation pressure can be formed in a more conventional manner. This can be obtained in the vehicles described above by forming the air intakes so that they extend round the front portion of the vehicle for that part of the periphery which experiences a positive stagnation pressure and by so presenting the intake orifices towards the region of the formation of positive stagnation pressure forwardly and downwardly that the aspect ratio of the forward to downward direction is not greater than unity. Air is then induced into the intake in sufficient quantity to prevent the formation of a positive pressure, or to reduce the pressure to a suitable value.

In the vehicle shown in FIGURES 1 to 5, the air induced into the intake 6 would be used to form the air curtains formed from supply ports 4, 14 and 15, and also used for propulsion and steering. In the vehicle shown in FIGURES 9 to 11, some of the air induced into the intake would be fed to the transfer duct 54, the remainder for propulsion and steering. Such an arrangement is particularly convenient as large mass flows of air are required to propel the vehicles at the high speeds which result in the high positive stagnation pressures and by obtaining this large mass flow from the stagnation area the pressure is reduced.

I claim:

1. A vehicle for operating over a surface, being at least partly supported above that surface by a cushion of pressurised gas contained at least in part by a fluid curtain, comprising means on said vehicle arranged to discharge at least one jet of fluid in such a way as to result in the formation of at least a part of said fluid curtain in a region exposed on movement of the vehicle to the formation of positive stagnation pressure, and means for reducing the positive stagnation pressure incident on that part of said curtain adjacent to the region in which said pressure is set up, including at least one air intake positioned outboard of said curtain adjacent to and directed towards said region, and means for drawing air into the vehicle through said intake from said region.

2. A vehicle as claimed in claim 1 including at least one propulsion outlet, and means for feeding part of the air withdrawn through said intake to the propulsion outlet, for propelling the vehicle.

3. A vehicle as claimed in claim 1 including outlets at the rear of the vehicle, at least one on each side of the longitudinal axis of the vehicle, means for feeding part of the air withdrawn through said intake to the outlets, and means controlling the relative flow of air through the outlets whereby a turning moment may be provided.

4. A vehicle as claimed in claim 1 including one propulsion outlet on each side of the longitudinal axis of the vehicle, means for feeding part of the air withdrawn through the said intake to the propulsion outlets, and means for varying the flow of air through each outlet whereby both propulsion and steering of the vehicle can be obtained.

5. A vehicle as claimed in claim 1 in which the air intake extends for that part of the periphery of the vehicle over which occurs a positive stagnation pressure when the vehicle is travelling forward.

6. A vehicle for operating over a surface, being at least partly supported above that surface by a cushion of pressurised gas contained at least in part by a curtain of moving air which, on movement of the vehicle, is exposed to the formation of positive stagnation pressure, comprising means for forming said curtain, and means for reducing the positive stagnation pressure incident on that part of said curtain adjacent to the region in which said pressure is set up, including at least one air intake positioned outboard of said curtain adjacent to and directed towards said region, and means for withdrawing air through said intake from said region and feeding at least part of said air to said curtain forming means.

7. A vehicle as claimed in claim 6 including at least one propulsion outlet situated at the rear of the vehicle, at least one duct communicating at its front end with the said intake and at its rear end with the propulsion outlet, and means for diverting part of the air, flowing from the said intake to the curtain forming means, through the duct to the propulsion outlet.

8. A vehicle as claimed in claim 6 including outlets at the rear of the vehicle, at least one outlet on each side of the longitudinal axis of the vehicle, at least one duct communicating at its forward end with said intake and at its rearward end with the outlets, means for diverting air, flowing to the curtain forming means, through the duct to the outlets, and means for controlling the relative flow of air through the outlets whereby a turning moment may be provided.

9. A vehicle as claimed in claim 6 including at least two propulsion outlets, one on each side of the longitudinal axis of the vehicle, at least one duct communicating at its forward end with said intake and at its rear end with the propulsion outlets, means for diverting part of the air flowing from said intake to the curtain forming means through the duct to the propulsion outlets, and means for varying the flow of air through each propulsion outlet whereby both propulsion and steering of the vehicle can be obtained.

10. A vehicle for operating over a surface, being at least partly supported above that surface by a cushion of pressurised gas contained at least in a forward facing region thereof by a fluid curtain which, on forward movement of the vehicle, is exposed to the formation of positive stagnation pressure, comprising, means on said vehicle arranged to discharge at least one jet of fluid in such a way as to result in the formation of the forward facing part of said fluid curtain, and means for reducing the positive stagnation pressure incident on the forward facing part of said fluid curtain, including at least one air intake positioned outboard and forward of said curtain forming means and directed towards the region in which said positive stagnation pressure incident on said forward facing part of said curtain is set up, and means for withdrawing air through said intake from said region.

11. A vehicle for operating over a surface, being at least partly supported above that surface by a cushion of pressurised gas contained at least in the forward facing region thereof by a curtain of moving air which, on forward movement of the vehicle, is exposed to the formation of positive stagnation pressure, comprising jet forming means on said vehicle arranged to discharge at least one jet of air in such a way as to result in the formation of said curtain, and means for reducing the positive stagnation pressure incident on that part of said curtain adjacent to the region in which said pressure is set up, including at least one air intake positioned adjacent to said jet forming means and forward thereof and presented in a downwardly inclined direction so as to face said region of positive stagnation pressure, and means for withdrawing air through said intake from said region and feeding at least part of said air to said jet forming means.

12. A vehicle for operating over a surface, being at least partly supported above that surface by a cushion of pressurised gas contained at least in part by a fluid curtain, comprising means on said vehicle arranged to discharge at least one jet of fluid in such a way as to result in the formation of at least a part of said fluid curtain in a region exposed on movement of the vehicle to the formation of positive stagnation pressure, and means for reducing the positive stagnation pressure incident on that part of said curtain adjacent to the region in which said pressure is set up, including at least one air intake positioned adjacent to said curtain forming means and outboard thereof, and means for withdrawing air through said intake from said region, said intake being inclined downwardly so as to face towards said region of positive stagnation pressure.

13. A vehicle for operating over a surface, being at least partly supported above that surface by a cushion of pressurised gas contained at least in part by a curtain of moving air which, on movement of the vehicle, is exposed to the formation of positive stagnation pressure, comprising jet forming means on said vehicle arranged to discharge at least one jet of air in such a way as to result in the formation of said curtain, and means for reducing the positive stagnation pressure incident on that part of said curtain adjacent to the region in which said positive stagnation pressure is set up, including at least one air intake orifice positioned adjacent to said jet forming means and outboard thereof, and means for withdrawing air through said intake from said region, said intake orifice being directed towards said region and inclined forwardly and downwardly so as to present an aspect ratio of the forward to downward direction not greater than unity.

References Cited by the Examiner

UNITED STATES PATENTS

| | | |
|---|---|---|
| 2,218,938 | 10/40 | Rinne. |
| 2,364,677 | 12/44 | Warner. |
| 2,387,627 | 10/45 | Warner. |
| 2,461,435 | 2/49 | Neumann et al. |
| 2,834,560 | 5/58 | Werner et al. |
| 2,932,468 | 4/60 | Kappus. |

FOREIGN PATENTS

| | | |
|---|---|---|
| 219,133 | 11/58 | Australia. |

OTHER REFERENCES

Publication: "Popular Science,": July 1959, pages 51 through 55 and 194.

A. HARRY LEVY, *Primary Examiner.*

PHILIP ARNOLD, *Examiner.*